United States Patent

Bill et al.

[11] Patent Number: 5,991,681
[45] Date of Patent: Nov. 23, 1999

[54] BRAKING SYSTEM FOR AUTOMOTIVE VEHICLES

[75] Inventors: Karlheinz Bill, Dreieich; Christof Klesen, Langgöns; Martin Semsch, Darmstadt, all of Germany

[73] Assignee: ITT Manufacturing Enterprises Inc., Wilmington, Del.

[21] Appl. No.: 08/945,197

[22] PCT Filed: Apr. 2, 1996

[86] PCT No.: PCT/EP96/01441

§ 371 Date: Mar. 2, 1998

§ 102(e) Date: Mar. 2, 1998

[87] PCT Pub. No.: WO96/33084

PCT Pub. Date: Oct. 24, 1996

[51] Int. Cl.6 .............................. B60K 28/16; B60T 8/32
[52] U.S. Cl. ................... 701/70; 701/71; 701/83; 701/78; 188/152; 188/141; 303/3; 180/244
[58] Field of Search ........................... 701/70, 71, 83, 701/78; 180/244; 188/141, 152; 303/3

[56] References Cited

U.S. PATENT DOCUMENTS

| | | | |
|---|---|---|---|
| 5,499,049 | 3/1996 | Every | 701/70 |
| 5,662,388 | 9/1997 | Wuerth et al. | 303/3 |
| 5,720,534 | 2/1998 | Stumpe | 180/244 |

*Primary Examiner*—William A. Cuchlinski, Jr.
*Assistant Examiner*—Olga Hernandez
*Attorney, Agent, or Firm*—Rader, Fishman & Grauer PLLC

[57] ABSTRACT

In a brake system, the actuating force of a pneumatic brake power booster, which is adapted to be independently activated, is indirectly determined. For this purpose, there is provided a pressure sensor which senses hydraulic pressure introduced into a master brake cylinder connected downstream of the brake power booster, and a differential pressure sensor which senses the pneumatic differential pressure which prevails in the housing of the brake power booster. An electronic controller calculates from both sensor signals the actuating force acting at an actuating pedal.

1 Claim, 1 Drawing Sheet

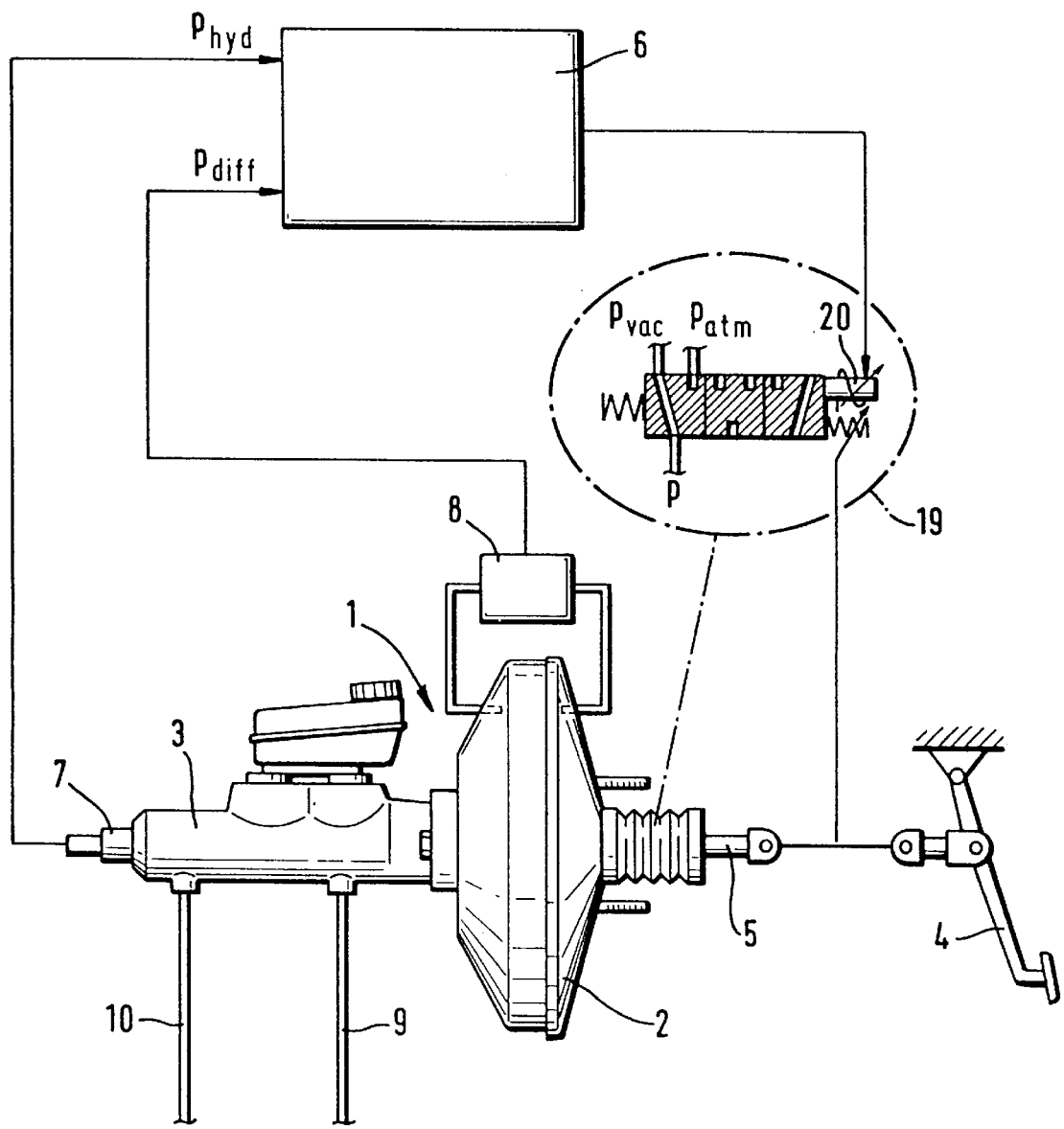

BRAKING SYSTEM FOR AUTOMOTIVE VEHICLES

BACKGROUND OF THE INVENTION

The present invention relates to a brake system for automotive vehicles including a controllable pneumatic brake power booster and a master brake cylinder, wherein a control valve of the brake power booster is operable by an actuating pedal, on the one hand, and is actuatable by a solenoid irrespective of the driver's wish, on the other hand, including an arrangement for determining the actuating force applied to the actuating pedal, and an electronic controller having control signals which are used to activate the solenoid.

In a combined actuation of the brake power booster by independent activation and by the actuating force applied to the actuating pedal, it is necessary to know about the actuating force in some possible applications, for example, in driving stability control operations.

German patent No. 33 25 854 discloses a brake controller for controlling a vehicle brake system which interacts with a brake power booster that is activatable irrespective of the driver's wish, preferably electrically. The mentioned electric activation is done by way of a control valve which is arranged outside the brake power booster and takes effect on a pneumatic differential pressure adapted to be introduced in the booster housing. The control valve is furnished with control signals of a data processing system which processes, as input quantities, signals from two sensor assemblies. The first sensor assembly includes a speed sensor having signals which are differentiated to determine the vehicle deceleration. The second sensor assembly is a force sensor which is used to determine the actuating force applied to the actuating pedal. The data processing system has static characteristic curves from which nominal deceleration values are derived.

A disadvantage of the prior art controller is the use of the force sensor for determining the above mentioned actuating force. The force sensor must be installed in the actuating rod of the brake power booster. Installation of the force sensor requires sophisticated structure, on the one hand, and involves problems, on the other hand, which are due to a limited mounting space.

Therefore, an object of the present invention is to provide measures which permit indirectly determining the actuating force that acts upon the actuating pedal.

SUMMARY OF THE INVENTION

According to the present invention, this object is achieved because the assembly includes a first sensor for determining the hydraulic pressure introduced into the master brake cylinder, a second sensor for determining the pneumatic differential pressure introduced into the brake power booster, and the electronic controller which calculates a third signal, representative of the actuating force, from the signals sent by the sensors.

The third signal is calculated preferably pursuant the relation $$F_{ped} = F(THZ) - F(Verst.) - F(Stor) == P_{hyd} * A(THZ) - P_{diff} * A(bW) - F(Stor)$$

with

F(THZ) being the output force of the brake power booster applied to the master cylinder piston, F(Verst.) being the boosting force of the brake power booster, $P_{hyd}$ being the hydraulic pressure introduced into the master brake cylinder, $P_{diff}$ being the pneumatic differential pressure introduced into the brake power booster, A(THZ) being the surface of the master cylinder piston, A(bW) being the active surface of a movable wall which generates the boosting force of the brake power booster, and F(Stor) designates the disturbance forces or dissipative forces occurring in the system.

BRIEF DESCRIPTION OF THE DRAWINGS

The only FIGURE in the drawing shows a schematic view of a brake system design according to the present invention.

DETAILED DESCRIPTION OF THE DRAWINGS

The automotive vehicle brake system of the present invention, shown only schematically in the drawing, includes an actuating unit 1 and an electronic controller 6. The actuating unit 1 has a pneumatic brake power booster, preferably a vacuum brake power booster 2, which is operable by an actuating pedal 4. Vehicle brakes (not shown) are connected to pressure chambers (not shown) of the master brake cylinder, preferably a tandem master cylinder 3 connected downstream of booster 2, by hydraulic lines 9, 10. An actuating rod 5 is coupled to the actuating pedal 4. Rod 5 permits actuating a control valve 19 (shown only schematically) which controls the build-up of pneumatic differential pressure in the housing of the vacuum brake power booster 2. A solenoid 20, activatable by control signals of the electronic controller 6, renders possible actuation of the control valve 19 independently of the driver's wish. A movable wall (not shown) subdivides the interior of the booster housing into a vacuum chamber and a working chamber. The vacuum chamber is permanently connected to an appropriate vacuum source, and the working chamber is connected to the atmosphere by actuating the control valve 19.

It is known that hydraulic pressure develops in the pressure chambers of the tandem master cylinder 3 when the vacuum brake power booster 2 is actuated. The hydraulic pressure is conducted to the vehicle brakes through the mentioned lines 9, 10. A pressure sensor 7 is provided to acquire information about the pressure introduced into the master cylinder 3. Preferably, sensor 7 is connected to the secondary pressure chamber of the master brake cylinder 3, and its signal $P_{hyd}$ is sent to the electronic controller 6. A second signal $P_{diff}$ which represents the pneumatic differential pressure developing in the booster housing upon actuation (which is also supplied to the controller 6), is furnished by a differential pressure sensor 8 connected to both chambers of the vacuum brake power booster 2. Sensor 8 can be mounted directly on the movable wall of the vacuum brake power booster 2, for example. From both signals $P_{hyd}$ and $P_{diff}$, the actuating force $F_{ped}$ introduced at the brake pedal 4 is indirectly determined in the electronic controller 6 or calculated pursuant the following relation:

$$F_{ped} = F(THZ) - F(Verst.) - F(Stor) == P_{hyd} * A(THZ) - P_{diff} * A(bW) - F(Stor).$$

A(THZ) designates the surface of the master cylinder piston, and A(bW) refers to the active surface of the above mentioned movable wall which generates the boosting force of the brake power booster. F(St'r) designates all disturbance forces or dissipative forces occurring in the system, such as friction forces and, more particularly, the influence of a resetting spring (not shown) which biasses the movable wall in opposition to the actuating direction.

We claim:

1. A brake system for automotive vehicles, comprising:
   a controllable pneumatic brake power booster and a master brake cylinder, wherein a control valve of the brake power booster is operable by both a actuating pedal, and a solenoid irrespective of the actuating pedal,
   means for determining an actuating force applied to the actuating pedal, and
   an electronic controller having control signals which are used to activate the solenoid,
   a first sensor for determining a hydraulic pressure introduced into the master brake cylinder,
   a second sensor for determining a pneumatic differential pressure introduced into the brake power booster, wherein said electronic controller calculates a third signal, representative of an actuating force, from the signals sent by the sensors wherein the third signal is calculated pursuant the relation $$f_{ped} = F(THZ) - F(Verst.) - F(St\ddot{o}r) =$$
$$= p_{hyd} * A(THZ) - P_{diff} * A(bW) - F(St\ddot{o}r)$$

and

| | |
|---|---|
| F(THZ) | is an output force of the brake power booster applied to a master cylinder Piston |
| F(Verst.) | is a boosting force of the brake power booster |
| $P_{hyd}$ | is the hydraulic pressure introduced into the master brake cylinder, |
| $P_{diff}$ | is the pneumatic differential pressure introduced into the brake power booster, |
| A(THZ) | is a surface of the master cylinder piston, |
| A(bW) | is an active surface of a movable wall which generates the boosting force Of the brake power booster, and |
| F(Stör) | designates disturbance forces or dissipative forces occurring in the system. |

* * * * *